United States Patent
Jeong et al.

(10) Patent No.: US 7,475,865 B2
(45) Date of Patent: Jan. 13, 2009

(54) CABLE PULLING MACHINE FOR USE IN REMOVING UNDERGROUND CABLES

(75) Inventors: Seong Taek Jeong, Daejeon (KR); Jin Woo Han, Daejeon (KR); Hyoung Woo Kim, Seoul (KR); Yong Kun Noh, Daejeon (KR); Wang Kyu Kang, Daejeon (KR); Byong Soo Woo, Daejeon (KR)

(73) Assignee: KT Corporation (KR)

( * ) Notice: Subject to any disclaimer, the term of this patent is extended or adjusted under 35 U.S.C. 154(b) by 0 days.

(21) Appl. No.: 11/939,514

(22) Filed: Nov. 13, 2007

(65) Prior Publication Data

US 2008/0111115 A1  May 15, 2008

(30) Foreign Application Priority Data

Nov. 14, 2006 (KR) ............ 10-2006-0112149

(51) Int. Cl.
*B21F 9/00* (2006.01)
(52) U.S. Cl. ............ 254/215; 254/221; 254/227; 254/134.5
(58) Field of Classification Search ........ 254/213, 254/214, 215, 221, 225, 226, 227, 242, 134.5, 254/134.3 R
See application file for complete search history.

(56) References Cited

U.S. PATENT DOCUMENTS

| | | | | |
|---|---|---|---|---|
| 4,445,668 A | * | 5/1984 | Sauber | 254/287 |
| 4,508,251 A | * | 4/1985 | Harada et al. | 226/25 |
| 4,971,293 A | * | 11/1990 | Roberson, Jr. | 254/265 |
| 5,464,193 A | * | 11/1995 | Wrate | 254/134.3 FT |
| 6,193,218 B1 | * | 2/2001 | Philyaw | 254/326 |
| 6,367,778 B1 | * | 4/2002 | Mobley et al. | 254/134.3 R |
| 7,341,404 B2 | * | 3/2008 | Tjader | 405/184.3 |
| 2007/0114503 A1 | * | 5/2007 | Baughman et al. | 254/134.5 |

FOREIGN PATENT DOCUMENTS

| | | |
|---|---|---|
| JP | 6-335130 A | 12/1994 |
| JP | 8-33142 A | 2/1996 |
| KR | 10-2002-0024678 A | 4/2002 |

\* cited by examiner

*Primary Examiner*—Emmanuel M Marcelo
(74) *Attorney, Agent, or Firm*—Knobbe Martens Olson & Bear LLP

(57) ABSTRACT

A machine of pulling out a cable from duct includes a main rotation jig connected to a hydraulic pressure motor and rotated contacting with the cable so as to pull out the cable, a winch rotated with the main rotation jig so as to stretch the pulled-out cable, a sub rotation jig mounted to be movable back and forth adjacent or separated from the main rotation jig and to be rotatable so as to stretch the cable between the main rotation jigs, and a table equipped with the main rotation jig, the winch and the sub rotation jig, and mounted vertical to the surface. The machine pulls out a cable in the fixed state to reduce the working area and labor force as well as to increase and control a traction power.

20 Claims, 9 Drawing Sheets

CABLE PULLING MACHINE FOR USE IN REMOVING UNDERGROUND CABLES

CROSS-REFERENCE TO RELATED PATENT APPLICATIONS

This application claims priority to and the benefit of Korean Patent Application No. 10-2006-0112149, filed Nov. 14, 2006, the disclosure of which is incorporated herein by reference in its entirety.

BACKGROUND

1. Field

The present disclosure generally relates to cable work, and more particularly, a machine for pulling a cable installed in an underground cable pipe.

2. Discussion of the Related Technology

A typical machine for pulling a copper cable installed underground has been a cargo crane or a vehicle equipped with an electric winch in a truck. In case of the vehicle equipped with an electric winch, a copper cable wound up with a wire drives the electric winch to pull out the cable. Otherwise, the vehicle moves itself to pull out the cable. In case of the cargo crane, a copper cable wound up with a wire drives the crane to pull out the cable.

However, a friction force acts on the cable due to sinking and damage of underground pipes or to inflow of soil into the pipes so that the cable is not removed from the pipe. In the conventional machine, it is difficult to put forth a large traction power or to pull out a copper cable with a constant force. Since it is impossible to control a delicate power, the balance of the power is broken instantly to cause accidents. Furthermore, the conventional machine occupies the large working area and labor force to result in a traffic jam or in civil appeals.

The foregoing discussion is to provide general background information, and does not constitute an admission of prior art.

SUMMARY

One aspect of the invention provides a machine for pulling a cable from an underground cable duct, comprising: a first rotation wheel connected to and rotatable by a hydraulic pressure motor; a winch rotatable along with the first rotation wheel and configured to take up a winch wire for use in engaging a cable with the machine; a second rotation wheel movable in a second direction toward and away from the first rotation wheel such that the first and second rotation wheels in combination squeeze and release the cable passing therebetween; and a table configured to support first rotation wheel, the winch and the second rotation wheel.

In the foregoing machine, the machine may further comprise a third rotation wheel movable in a third direction toward and away from the first rotation wheel such that the first and third rotation wheel in combination squeeze and release a cable passing therebetween. At least one of the first and second rotation wheels may comprise a band of surface configured to contact the cable, wherein the surface may comprise a plurality of friction structures for improving friction characteristics of the surface with the cable. At least one of the first and second rotation wheels may comprise a couple of guiding walls configured to guide the cable placed therebetween when the cable is engaged with the first and second rotation wheels. At least one of the first and second rotation wheels may comprise a circumference, which is in an oval shape. The machine may further comprise a hydraulic pressure cylinder configured to actuate the second rotation wheel to move along the second direction. The machine may further comprise a speed controller configured to control a rotational speed of the first rotation wheel. The table may comprise a plurality of legs to be placed on a surface. At least one of the plurality legs may further comprise a leveling device configured to adjust leveling of a top surface of the table.

Various embodiments of the present invention are directed at providing a machine of pulling out a cable from duct, wherein the machine comprises a main rotation jig, a sub rotation jig, a hydraulic pressure motor, a hydraulic pressure cylinder, a table and a rotation seat, thereby pulling out a cable in the fixed state to reduce the working area and labor force as well as to increase and control a traction power.

According to an embodiment of the present invention, a machine of pulling out a cable from duct comprises: a main rotation jig connected to a hydraulic pressure motor and rotated contacting with the cable so as to pull out the cable; a winch rotated with the main rotation jig so as to stretch the pulled-out cable; a sub rotation jig mounted to be movable back and forth adjacent or separated from the main rotation jig and to be rotatable so as to stretch the cable between the main rotation jigs; and a table equipped with the main rotation jig, the winch and the sub rotation jig, and mounted vertical to the surface, thereby pulling out a cable in the fixed state as well as reducing the working area.

The sub rotation jig comprises: a horizontally rotating jig that moves back and forth horizontal to the main rotation jig; and a vertically rotating jig that moves back and forth vertical to the main rotation jig. The sub rotation jig pulls out a cable while the cable is fixed between the rotation jigs doubly.

The sub rotation jig has a plurality of protrusion parts located with a given interval so that the main rotation jig is engaged with the sub rotation jig, thereby pulling out a cable.

The sub rotation jig has wing plates at both end portions of the jig so that a cable may not be dislocated from the rotation jig.

The sub rotation jig has an oval cross section. When the diameter of the cable is different, the oval cross section is applicable.

The machine further comprises: a hydraulic motor for rotating the main rotation jig; a decelerator that controls the hydraulic pressure motor for rotating the main rotation jig and the rotation speed of the main rotation jig; and a hydraulic pressure cylinder for moving the sub rotation jig back and forth, thereby obtaining a traction power.

The bottom of the table has a plurality of legs so as to use a reaction force of the surface when the cable is pulled out.

The bottom end part has a rotation seat capable of leveling off. When the surface is not horizontal, the rotation seat can locate the table of the machine horizontally.

BRIEF DESCRIPTION OF THE DRAWINGS

Other aspects and advantages of the present invention will become apparent upon reading the following detailed description and upon reference to the drawings in which.

DETAILED DESCRIPTION OF EMBODIMENTS

Embodiments of the present invention will be described in detail with reference to the accompanying drawings.

Figure 1:
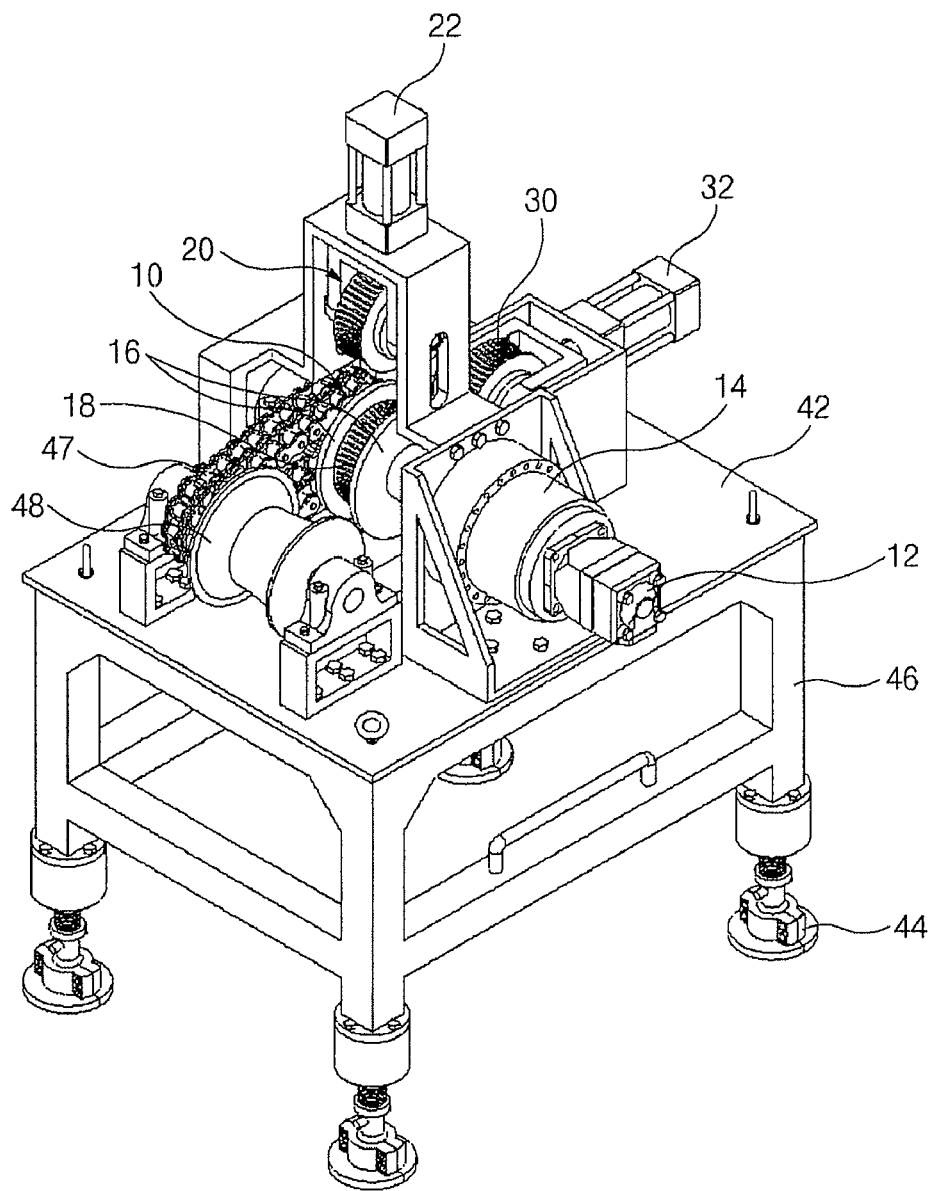
FIG. 1 is a perspective view illustrating a machine of pulling out a cable from duct according to an embodiment of the present invention.
Figure 2:
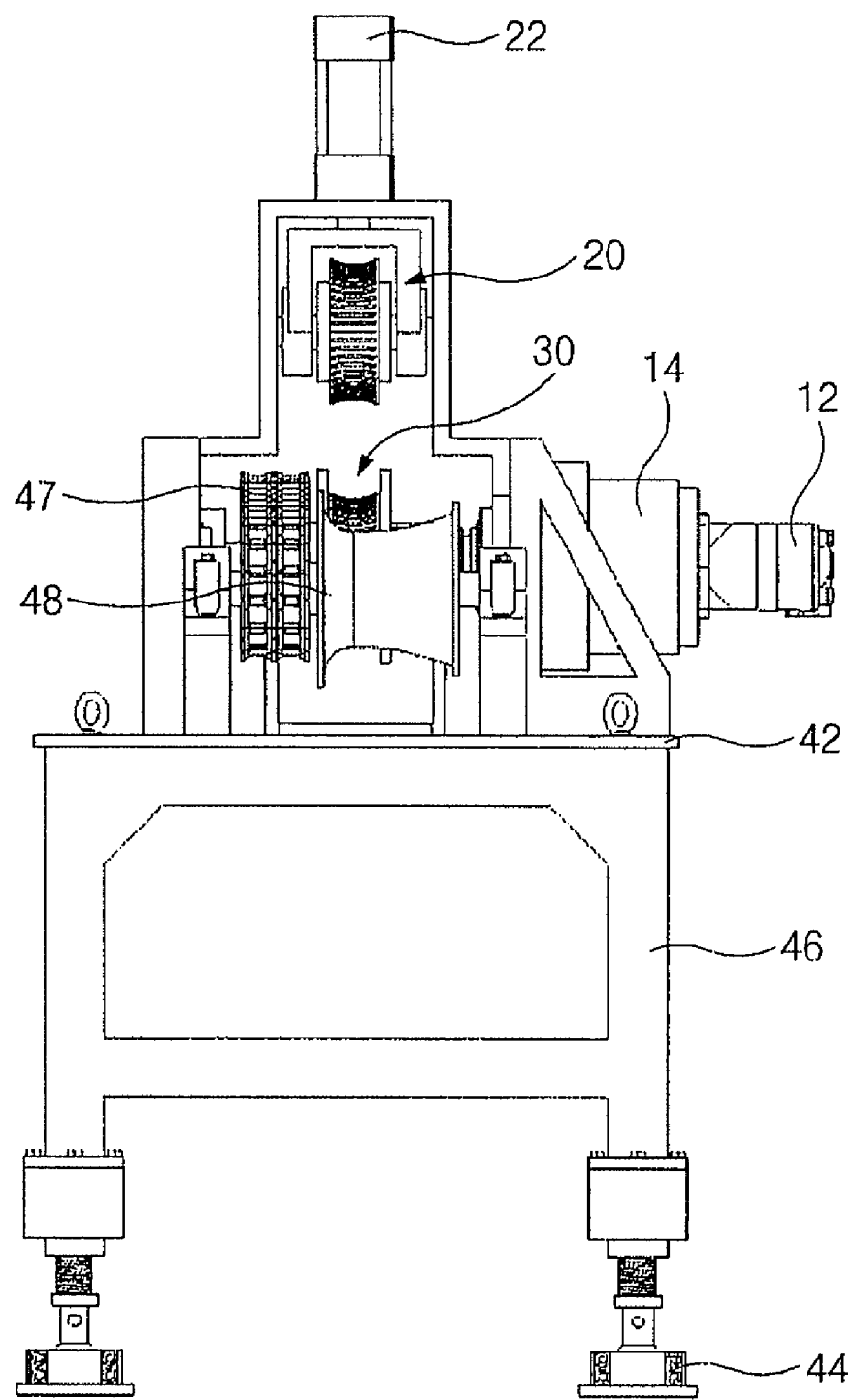
FIGS. 2 and 3 are front and rear views illustrating the machine of pulling out a cable from duct according to an embodiment of the present invention.
Figure 3:
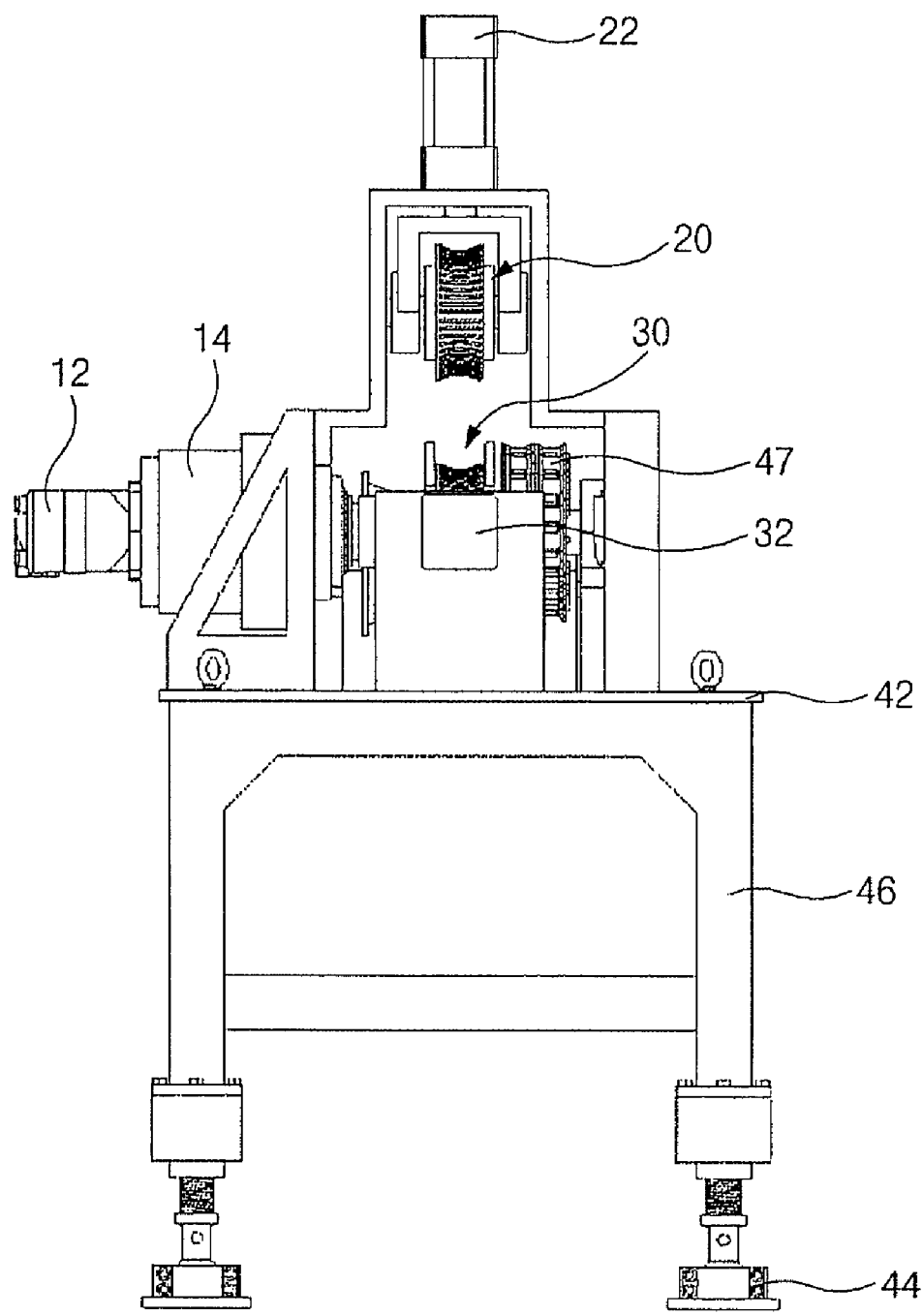
Figure 4:
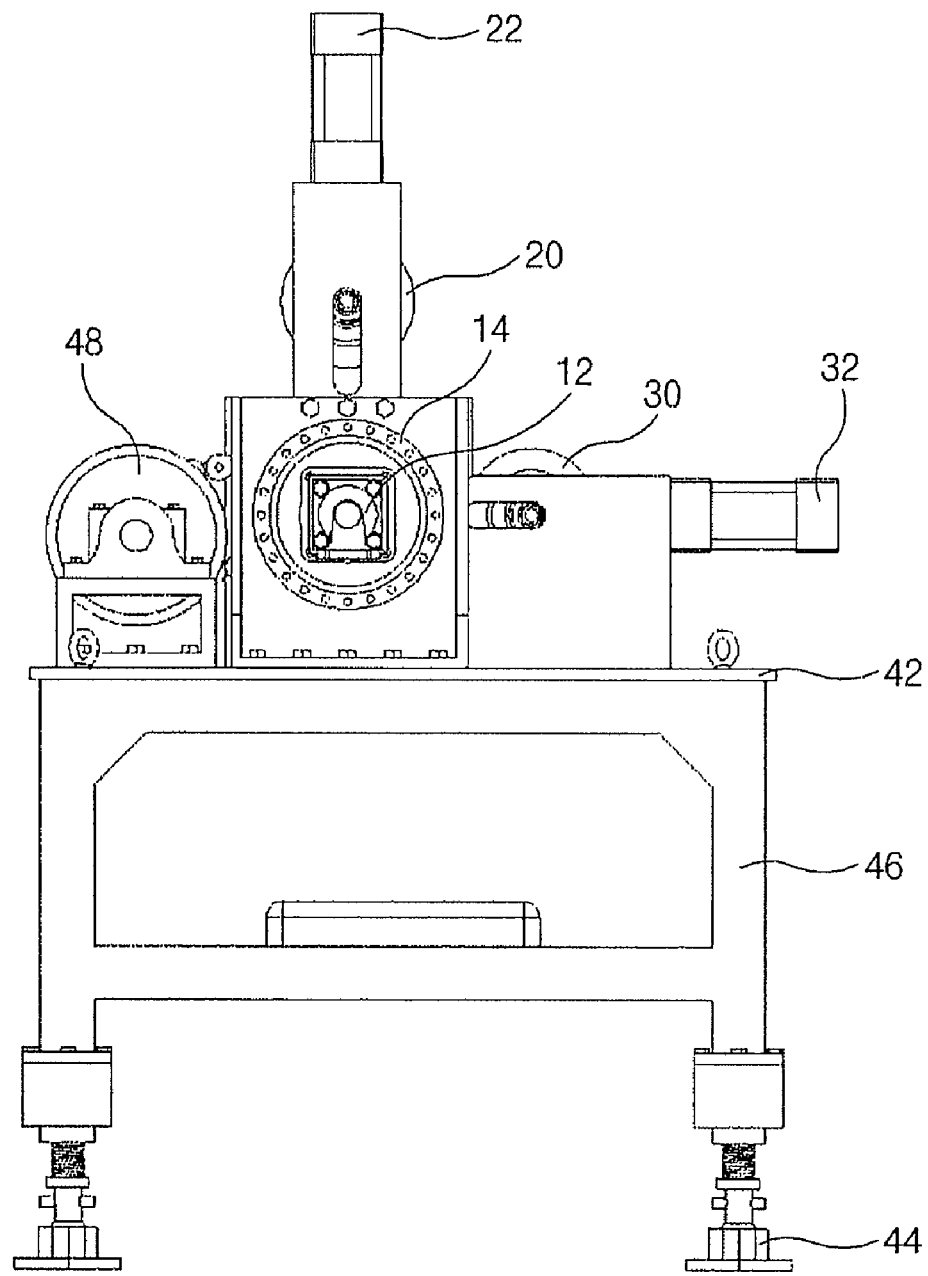
FIGS. 4 and 5 are left and right side views illustrating the machine of pulling out a cable from duct according to an embodiment of the present invention.
Figure 5:
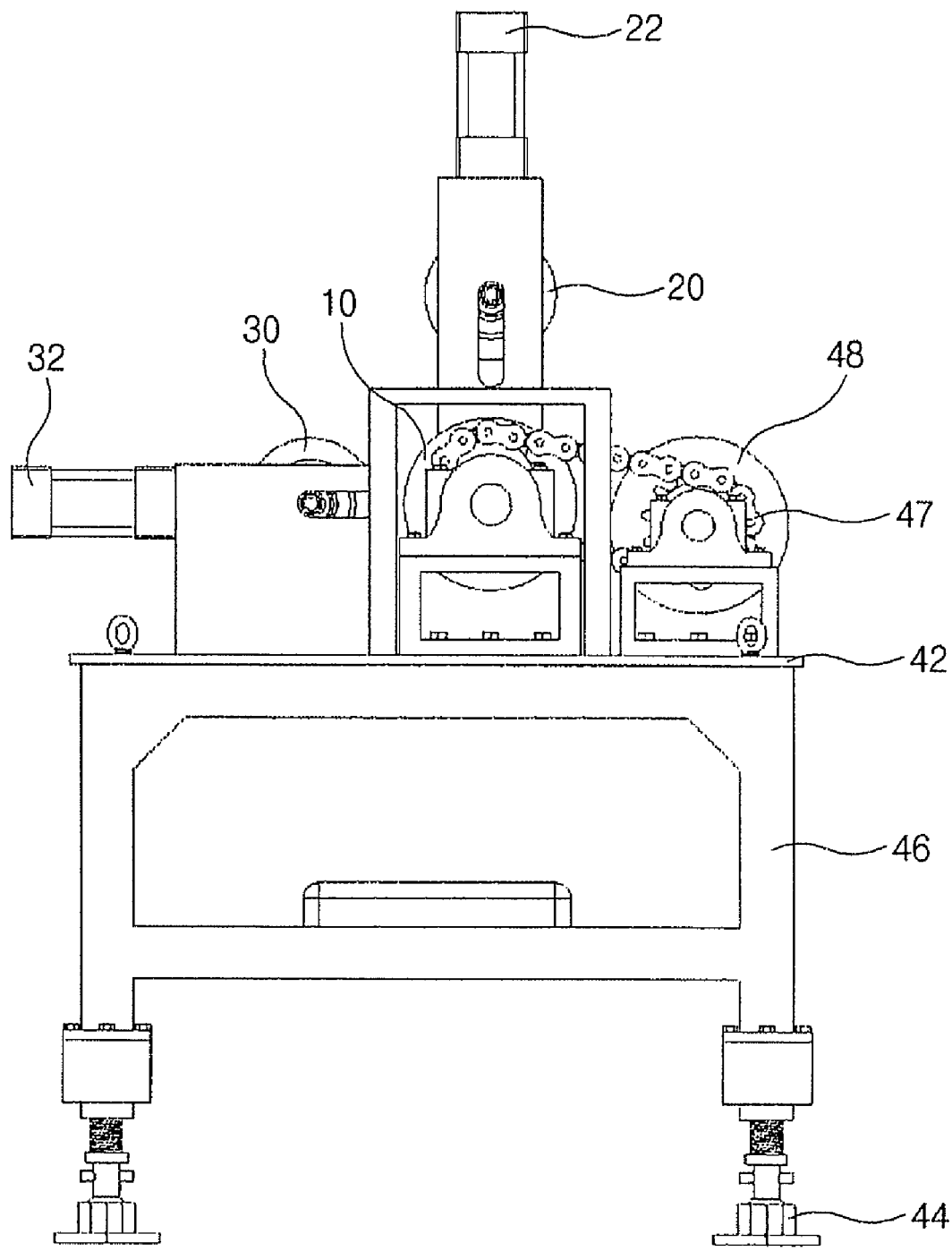

FIG. 1 is a perspective view illustrating a machine of pulling out a cable from duct according to an embodiment of the present invention. FIGS. 2 through 7 are front and rear views, left and right side views, and plane and bottom views illustrating the machine of pulling out a cable from duct according to an embodiment of the present invention;

In an embodiment of the present invention, the machine of pulling out a copper cable from duct comprises a main rotation jig 10 for pulling out a cable, and a sub rotation jig including a vertically rotating jig 20 and a horizontally rotating jig 30. The main rotation jig 10 is rotatable in connection with a hydraulic motor 12, and connected with a decelerator 14 to control the rotation speed (rpm) and increase the initial traction power.

The vertically rotating jig 20 is located over the main rotation jig 10 and connected to a vertical hydraulic pressure cylinder 22 mounted above the vertically rotating jig 20 so that the jig 20 is movable back and forth toward the main rotation jig 10 (i.e. vertically) by the operation of the hydraulic pressure cylinder 22. In the same way, the horizontally rotating jig 30 is located at the side of the main rotation jig 10 and connected to a horizontal hydraulic cylinder 32 mounted at the side of the horizontally rotating jig 30 so that the jig 30 is movable back and forth toward the main rotation jig 10, (i.e. horizontally) by the operation of the hydraulic pressure cylinder 32.

In the machine of pulling out a cable from duct, a cable is inserted between the main rotation jig 10 and the sub rotation jigs 20 and 30, and the sub rotation jigs 20 and 30 moves adjacent toward the main rotation jig 10 to pull out the cable.

A winch 48 is mounted adjacent to the main rotation jig 10 so as to stretch the cable pulled out by the rotation jigs 10, 20 and 30. The winch 48 is connected to the main rotation jig 10 by a chain 47, and rotated with rotation of the main rotation jig 10. When a part of the cable is pulled out at the initial stage, the winch 48 fixes the cable by winding the cable with a winch wire connected to the end of the cable.

The rotation jigs 10, 20, 30 and the winch 48 are mounted over a table 42 that has a square plate shape. The table 42 is positioned horizontally to endure a vertical traction power in the operation of the machine. The table 42 has a plurality of legs 46 so that a worker can come and go freely into a manhole. The bottom end part of the leg 46 has a rotation seat 44 capable of leveling off the table 42. As a result, it is possible to work out in a slope place.

In this embodiment, the structure of the main rotation jig 10 is explained because the structures of the rotation jigs 10, 20 and 30 are substantially the same.

Figure 6:
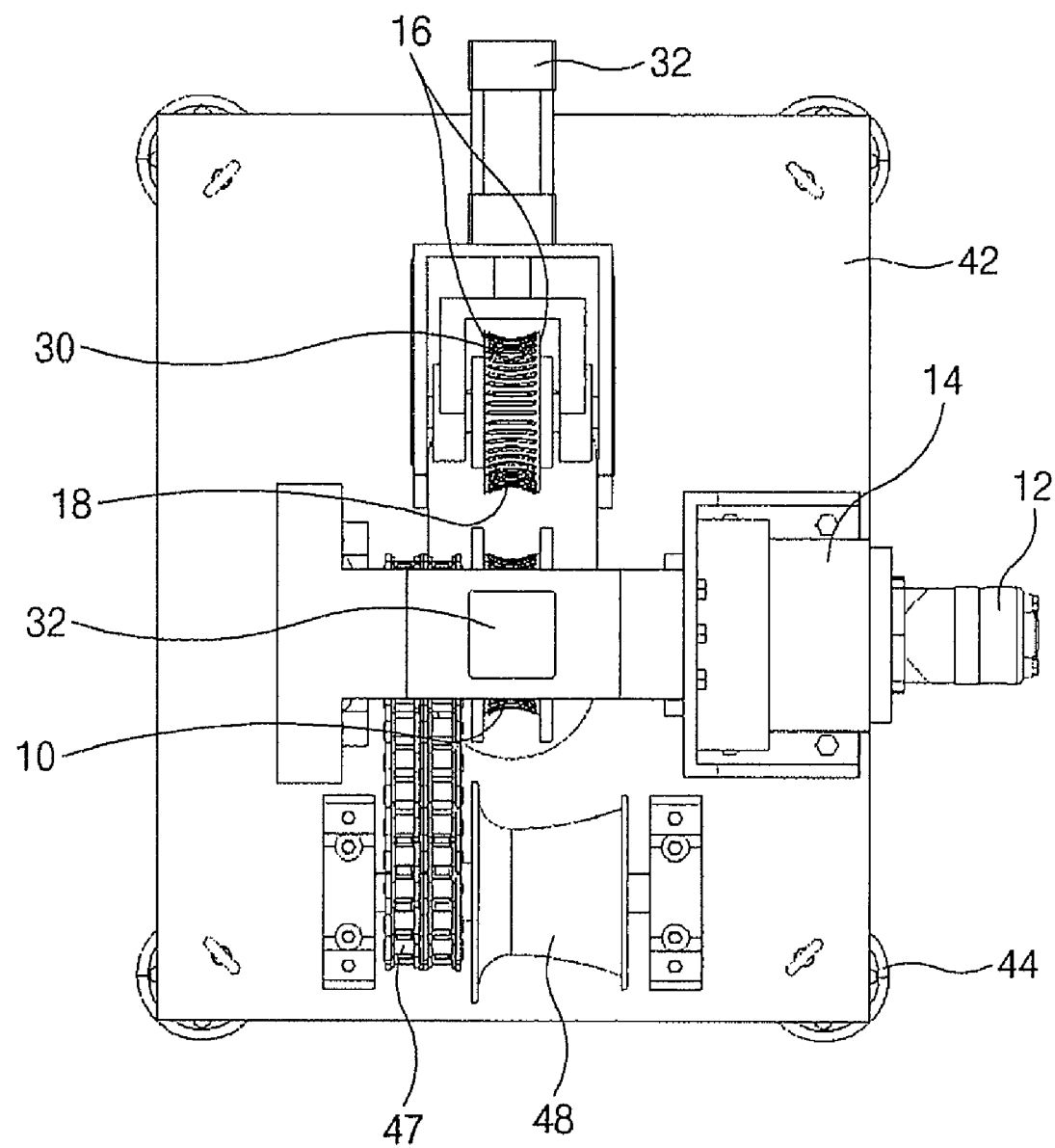
FIGS. 6 and 7 are plane and bottom views illustrating the machine of pulling out a cable from duct according to an embodiment of the present invention.
Figure 7:
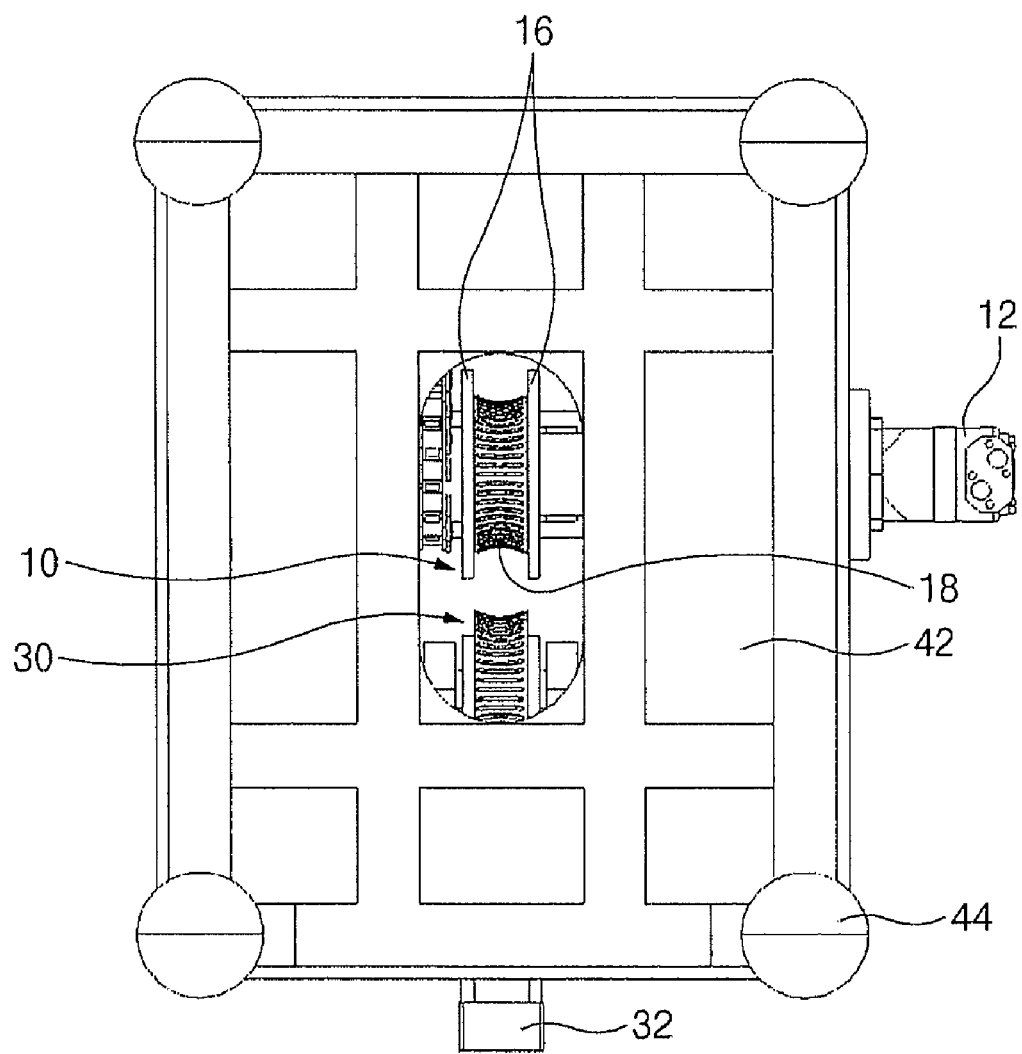

Referring to FIGS. 1, 6 and 7, the main rotation jig 10, which has a thin cylindrical shape, and has wing plates 16 at both end portions of the jig. The wing plate 16 fixes the location of the cable inside the rotation jig 10 so that the cable sheath may not be torn and the cable may not be dislocated outside. Around the main rotation jig 10, a plurality of protrusion units 18 are positioned with a given interval so that the pulled out cable may be fixed tight. Due to the protrusion unit 18, the main rotation jig 10 engaged with the sub rotation jigs 20 and 30 can be rotated simultaneously.

As shown in FIGS. 6 and 7, the cross section of the rotation jig 10 has an oval cross section so that the rotation jig 10 can pull out the cable of various diameters.

Figure 8:
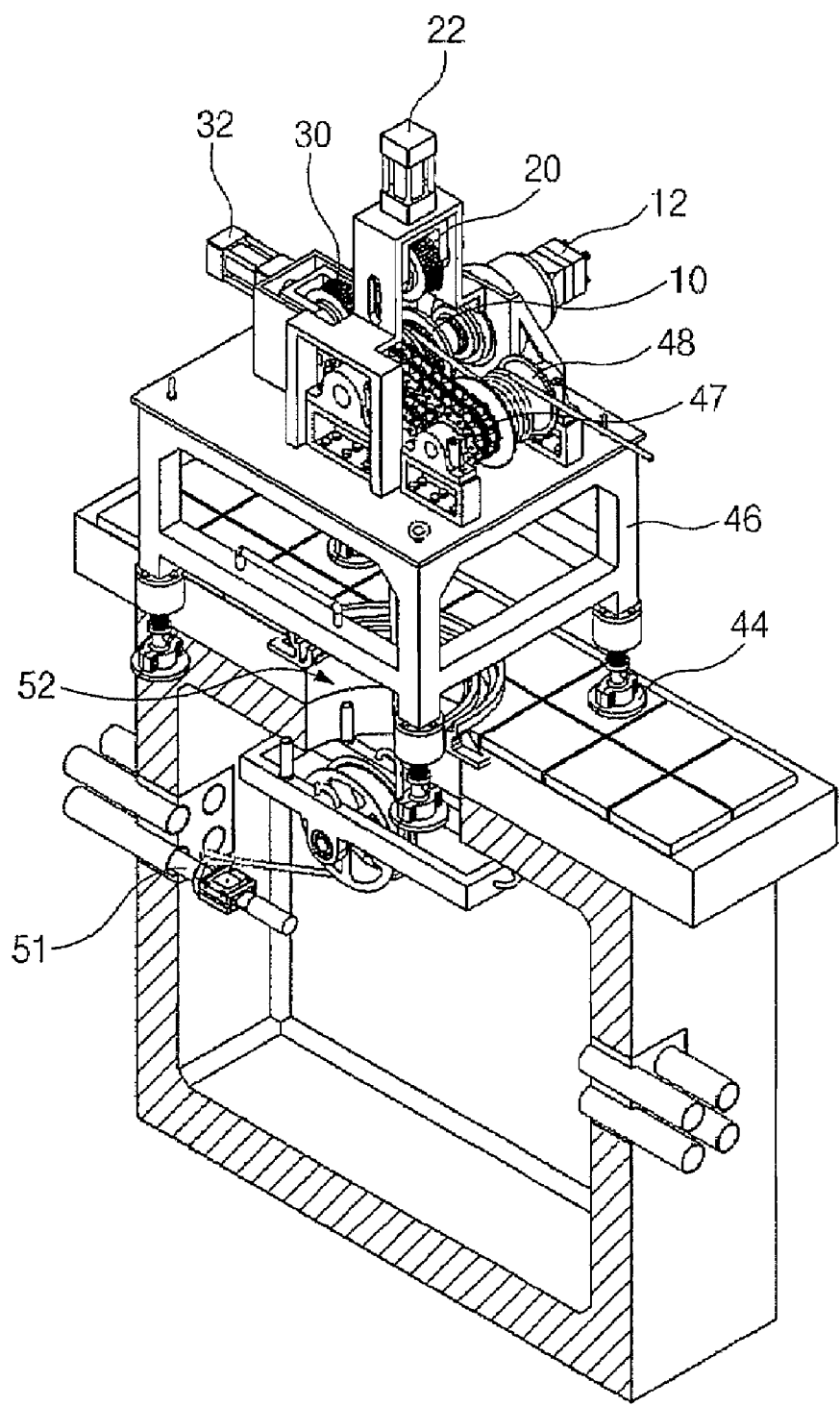
FIGS. 8 and 9 are diagrams illustrating the operating state of the machine of pulling out a cable from duct according to an embodiment of the present invention.
Figure 9:
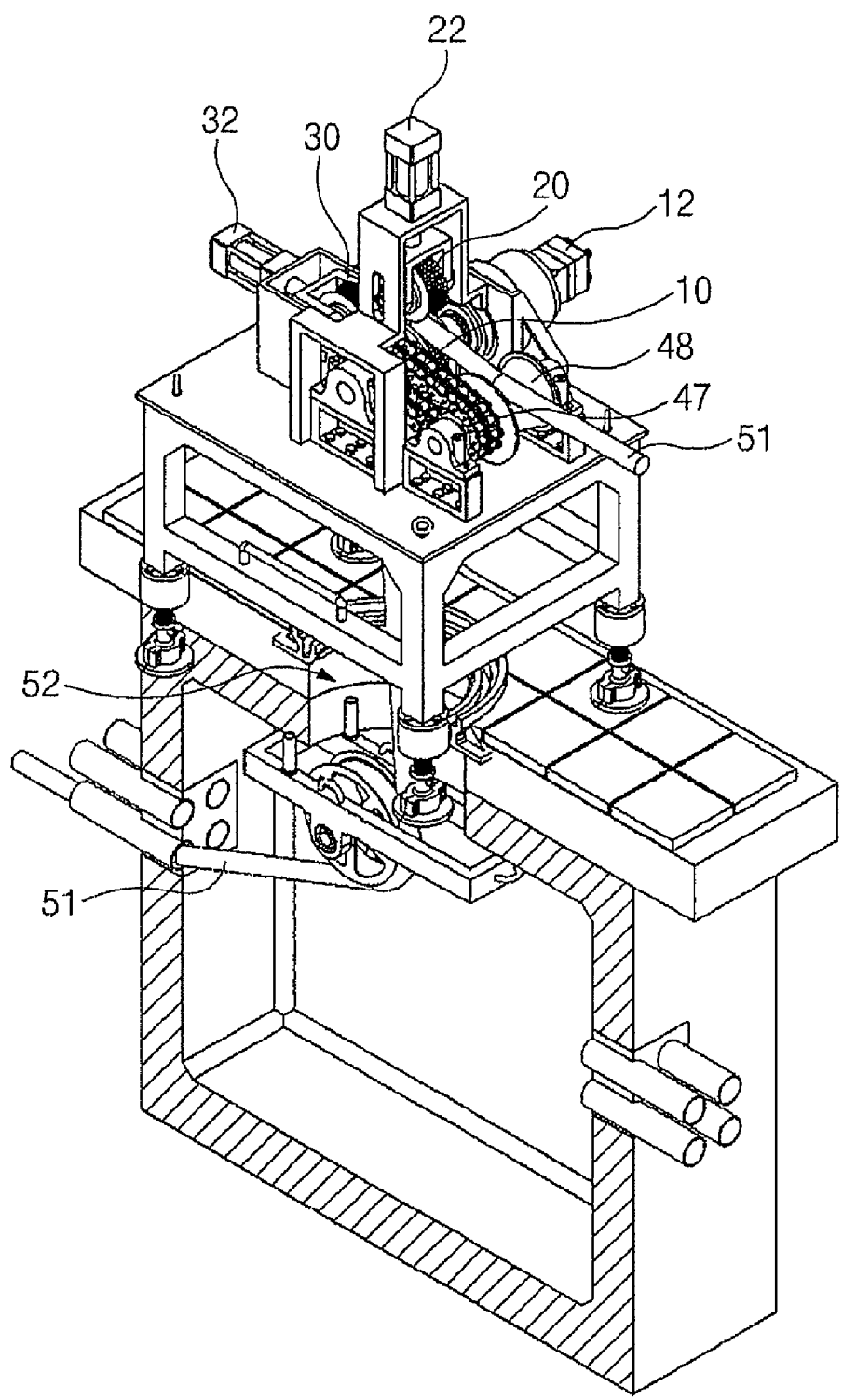

FIGS. 8 and 9 are diagrams illustrating the operating state of the machine of pulling out a cable from duct according to an embodiment of the present invention.

A cable 51 is connected to a winch wire with an additional jig. The winch wire is connected to the winch 48, and one end portion of the winch 48 is wound up with the wire. The winch 48 is initially driven to insert a part of the cable 51 between the main rotation jig 10 and the horizontally rotating jig 30, thereby pulling out the cable.

The hydraulic pressure cylinder 32 of the horizontally rotating jig 30 is driven to move the horizontally rotating jig 30 toward the main rotation jig 10 horizontally so that the cable 51 is compressed between the main rotation jig 10 and the horizontally rotating jig 30. In the same way, the hydraulic pressure cylinder 22 of the vertically rotating jig 20 is driven to move the vertically rotating jig 20 toward the main rotation jig 10 vertically so that the cable 51 is compressed between the main rotation jig 10 and the vertically rotating jig 20. The hydraulic cylinder 32 can give a large traction power, and the cable 51 is fixed to the rotation FIGS. 10, 20 and 30, and is not dislocated from the rotation jigs 10, 20 and 30 but fixed.

The hydraulic pressure motor 12 rotates the main rotation jig 10 with the large traction power due to a hydraulic pressure. Also, the winch 48 connected by the chain 47 and the sub rotation jigs 20 and 30 engaged with the main rotation jig 10 is rotated with the main rotation jig 10 simultaneously. The cable 51 pulled out among the rotation jigs 10, 20 and 30 is easily removed by the rotation jigs 10, 20 and 30.

In the embodiment of the present invention, the machine of pulling out a cable can remove the cable 51 while the machine itself is not moved but fixed over a manhole 52 (see FIGS. 8 and 9) to reduce the working area and labor force. Also, the machine can remove the cable at one place continuously. The hydraulic pressure (hydraulic pressure motor and hydraulic pressure cylinder) increases a traction power, which is controlled by the decelerator 14. As a result, resources can be reused.

As described above, the machine of pulling out a used cable from duct according to an embodiment of the present invention pulls out a cable in the fixed state to reduce the working area and labor force as well as to increase and control a traction power.

While the invention is susceptible to various modifications and alternative forms, specific embodiments have been shown by way of example in the drawings and described in detail herein. However, it should be understood that the invention is not limited to the particular forms disclosed. Rather, the invention covers all modifications, equivalents, and alternatives falling within the spirit and scope of the invention as defined in the appended claims.

What is claimed is:

1. A machine for pulling a cable, comprising:
  a first rotation wheel rotatable about an axis;
  a second rotation wheel movable in a second direction toward and away from the first rotation wheel such that the first and second rotation wheels in combination squeeze and release a cable passing therebetween; and
  a third rotation wheel movable in a third direction toward and away from the first rotation wheel such that the first and third rotation wheels in combination squeeze and release the cable passing therebetween.

2. The machine according to claim 1, wherein at least one of the first and second rotation wheels comprises a band of surface configured to contact the cable, wherein the surface comprises a plurality of friction structures.

3. The machine according to claim 1, wherein at least one of the first and second rotation wheels comprises a couple of guiding walls configured to guide the cable placed therebetween when the cable is engaged with the first and second rotation wheels.

4. The machine according to claim 1, further comprising:
a speed controller configured to control a rotational speed of the first rotation wheel.

5. The machine according to claim 1, further comprising: a table comprising a plurality of legs and configured to support the first rotation wheel and the second rotation wheel.

6. The machine according to claim 5, wherein at least one of the plurality legs further comprises a leveling device configured to adjust leveling of a top surface of the table.

7. The machine of claim 1, further comprising a hydraulic pressure motor configured to actuate the first rotation wheel to rotate the first rotation wheel.

8. The machine of claim 1, further comprising a winch rotatable along with the first rotation wheel and configured to take up a winch wire.

9. The machine of claim 1, further comprising a hydraulic pressure cylinder configured to actuate the second rotation wheel or the third rotation wheel for moving toward and away from the first rotation wheel.

10. The machine of claim 1, further comprising the cable, which passes between the first and second rotation wheels and further passes between the first and third rotation wheels.

11. A machine for pulling a cable, comprising:
a first rotation wheel rotatable about an axis; and
a second rotation wheel movable in a second direction toward and away from the first rotation wheel such that the first and second rotation wheels in combination squeeze and release a cable passing therebetween,
wherein at least one of the first and second rotation wheels comprises a circumference, which is in an oval shape.

12. The machine of claim 11, further comprising:
a third rotation wheel movable in a third direction toward and away from the first rotation wheel such that the first and third rotation wheels in combination squeeze and release the cable passing therebetween.

13. The machine of claim 11, further comprising a hydraulic pressure motor configured to actuate the first rotation wheel to rotate the first rotation wheel.

14. The machine of claim 11, further comprising a winch rotatable along with the first rotation wheel and configured to take up a winch wire.

15. The machine of claim 11, further comprising: a hydraulic pressure cylinder configured to actuate the second rotation or the third rotation wheel for moving toward and away from the first rotation wheel.

16. A machine for pulling a cable, comprising:
a first rotation wheel rotatable about an axis;
a second rotation wheel movable in a second direction toward and away from the first rotation wheel such that the first and second rotation wheels in combination squeeze and release a cable passing therebetween; and
a hydraulic pressure cylinder configured to actuate the second rotation wheel to move along the second direction.

17. The machine of claim 16, further comprising:
a third rotation wheel movable in a third direction toward and away from the first rotation wheel such that the first and third rotation wheels in combination squeeze and release the cable passing therebetween.

18. The machine of claim 16, further comprising a hydraulic pressure motor configured to actuate the first rotation wheel to rotate the first rotation wheel.

19. The machine of claim 16, further comprising a winch rotatable along with the first rotation wheel and configured to take up a winch wire.

20. The machine of claim 16, wherein at least one of the first and second rotation wheels comprises an oval shaped circumference.

* * * * *